US008560137B2

(12) United States Patent
Whittam et al.

(10) Patent No.: US 8,560,137 B2
(45) Date of Patent: Oct. 15, 2013

(54) HIGH-VOLTAGE STEP-CHARGE CONTROL FOR USE IN NETWORK-POWERED APPLICATIONS

(75) Inventors: Simon Whittam, Kanata (CA); Marcos Vivas, Kanata (CA)

(73) Assignee: Alcatel Lucent, Paris (FR)

(*) Notice: Subject to any disclaimer, the term of this patent is extended or adjusted under 35 U.S.C. 154(b) by 472 days.

(21) Appl. No.: 12/794,177

(22) Filed: Jun. 4, 2010

(65) Prior Publication Data
US 2011/0301771 A1 Dec. 8, 2011

(51) Int. Cl.
*G05D 11/00* (2006.01)
(52) U.S. Cl.
USPC ............................... 700/293; 702/62; 307/75
(58) Field of Classification Search
USPC .................. 700/286, 293; 702/62; 307/75
See application file for complete search history.

(56) References Cited

U.S. PATENT DOCUMENTS

| 2002/0044331 A1* | 4/2002 | Agrawal et al. ............... 359/265 |
| 2003/0052008 A1* | 3/2003 | Liu et al. ........................ 204/459 |
| 2003/0071033 A1* | 4/2003 | Riess et al. .................... 219/633 |
| 2004/0012986 A1* | 1/2004 | Riggio et al. ................... 363/26 |
| 2004/0050839 A1* | 3/2004 | Riess et al. .................... 219/603 |
| 2006/0000460 A1* | 1/2006 | Masters et al. ............... 123/609 |
| 2006/0152085 A1* | 7/2006 | Flett et al. ...................... 307/75 |
| 2007/0135155 A1* | 6/2007 | Lehr et al. ..................... 455/522 |
| 2007/0136010 A1* | 6/2007 | Gunn et al. ..................... 702/62 |
| 2007/0228999 A1* | 10/2007 | Kit .................................. 315/291 |
| 2008/0174922 A1* | 7/2008 | Kimbrough ..................... 361/42 |
| 2008/0253085 A1* | 10/2008 | Soffer ........................... 361/687 |

* cited by examiner

*Primary Examiner* — Mohammad Ali
*Assistant Examiner* — Anthony Whittington
(74) *Attorney, Agent, or Firm* — Kramer & Amado P.C.

(57) ABSTRACT

An over-current input conditioning limiter is disclosed for remote equipment. The over-current input conditioning limiter includes a current sensing apparatus, a semiconductor switch, and a programmable controller for controlling the peak current drawn from a pair of supply lines. The over-current input conditioning limiter is particularly useful for overcoming voltage collapse and over-current shutdowns of network power supplies feeding remote apparatus known in the art.

19 Claims, 6 Drawing Sheets

HIGH-VOLTAGE STEP-CHARGE CONTROL FOR USE IN NETWORK-POWERED APPLICATIONS

FIELD OF THE INVENTION

The invention relates to network powered remote located equipment applications and is particularly concerned with high voltage step charging of power supplies contained therein.

BACKGROUND OF THE INVENTION

Network Powered (+/−190 Vdc or +/−130 Vdc) equipment applications are subject to various restrictions on the twisted pair cables (22AWG/24AWG or similar) typically used in Telecom Applications. The input source is also restricted to voltage, current and power levels (i.e. +/−190V+/−3%, 250-265 mA and 100 VA) thus impeding the total available loop length for higher powered applications.

In particular, the current limitation represents some unique issues with respect to charging input bulk capacitance and controlling fault conditions which could collapse the input source. Most input inrush solutions are based on low voltage or more common −48V Telecom inputs. Typical controllers or discrete solutions limit the peak current on a single startup attempt and are not restricted to the amount of current provided by the input source. In the case for Network Powered applications, a large bulk capacitance cannot be charged with a constant current source method as this would incur excessive losses in the input power switch and undesirable time constraints. By pulse charging in stages, at just under the peak current limitation, the input source is not affected. Also, for fault conditions, the power switch will be destroyed if it is stressed outside of its Safe Operating Area (SOA). Typically hiccup current limiting has to be adopted here to provide a single solution for both operating conditions. The step-charging method, by design, also provides this feature.

Existing solutions may depend on fuses (fault conditions or ptc/thermistors (charging) to manage current drawn from the input source. Only under true abnormal conditions should the fuse be relied upon to safely limit the undesirable effects of a fault. Over temperature, passive devices such as thermistors (NTC), used for inrush current control, are unreliable and their trip thresholds vary over temperature. Since a SEM must operate in adverse working environments and is subject to radical change in internal temperatures, these devices are not applicable for consistent performance. Many PTC, aka resettable fuse, devices are also not rated for the high voltages associated (>200 Vdc) with the input section of the SEM.

For inrush control, common −48V ICs are available but are not rated for this voltage level and do not provide the pulse charging feature during startup nor do they provide the programmable hiccup timer exactly as desired. Also, 12V and 48V/60V sources are typically high current power supplies and able to provide peak startup/inrush currents in/around 3 A or more in typical 100 W applications. For the latter, the highest charge to be applied to an input bulk capacitance is 75V which is ⅕ the requirement here. For Network powered applications, the available charge currents are limited (250 mA) for charging large bulk capacitances to higher voltages extending to 400V. In order to not current limit the source, charge the capacitance in a reasonable amount of time, and not exceed the Safe Operating Area of the pass-FET, a step-charging method with peak fault-current monitoring is needed.

Therefore, it would be desirable to have an inrush power control scheme that take into account both these critical resources of surge current and peak demand.

SUMMARY OF THE INVENTION

It is an object of the invention to provide a means of controlling current input to a remote apparatus from a network power supply.

According to an aspect of the invention there is provided an apparatus for providing input current conditioning of supply current provided to a remote apparatus from a network power supply, the apparatus having a current controller operable to receive a maximum current limit value; a current sensing circuit connected to the current controller; and a controllable series element through which supply current flows and which can be rendered non-conductive by the current controller when the current sensing circuit indicates that a supply current exceeds the maximum current limit value.

In some embodiments of the invention the apparatus further has a programmable controller connected to the current controller; and the programmable controller can be the source of the maximum current limit. In some embodiments the programmable controller has a processor; and a memory associated with the processor; wherein the memory contains programming instructions and values related to the maximum current limit value. In some embodiments of the invention there is voltage sensing circuitry connected to the current controller, and the current controller and processor are connected over a communications bus which may be an Integrated interface Controller bus, and wherein measured values of current and voltage may be communication over the communications bus.

In some versions of the invention the measured values may be stored for use in later calculations. These later calculations may include, without limit, calculations such as calculating operational statistics, performing fault analysis and calculating changes in operational settings. In some versions of the invention the results of the later calculations are used to change operating characteristics of the current controller, and in some versions the results of the later calculations may be reported to an operator.

In another embodiment of the invention there is enable circuitry connected from the current controller to a downstream power supply; and the current controller can use the enable circuitry to disable the downstream power supply. The downstream power supply may be disabled until a preset operational state is reached. In some versions of the invention, the preset operational state corresponds to a particular monitored voltage level.

In some versions of the invention, the controllable series element is a semiconductor device. In some versions the semiconductor device may be a Field Effect Transistor. In alternative versions the semiconductor device may be a bipolar transistor.

According to another aspect of the invention there is provided a method for controlling the current drawn by a remote apparatus from a network power supply, the method having the steps of: monitoring the current drawn by a current controller located in the remote apparatus; comparing the current drawn to a preset threshold current value; and in the event that the current drawn exceeds the preset threshold current, then opening a pass element for a period of time. In some versions of the invention, after the period of time has passed, the step of closing the pass element is done to allow current to flow.

In another embodiment of the invention, there are further steps of measuring a voltage at the remote apparatus; comparing the measured voltage to a preset threshold of voltage; and in the event that the measured voltage meets or exceeds the preset threshold, then enabling additional circuitry to draw current from the network supply.

According to some embodiments of the invention, there are the additional steps of measuring a voltage at the remote apparatus; measuring the current drawn at the remote apparatus; and storing the voltage and current measurements for later calculations. In some embodiments there are the additional steps of performing the later calculations, and transmitting the results of the later calculations to an operator.

Note: in the following the description and drawings that follow merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which.

In the following figures, like features bear similar reference labels.

DETAILED DESCRIPTION

According to a proposed embodiment of the invention there is established an apparatus for conditioning the input currents drawn by a remotely powered apparatus to levels which avoid placing a network power supply in a fault mode.

Figure 1:
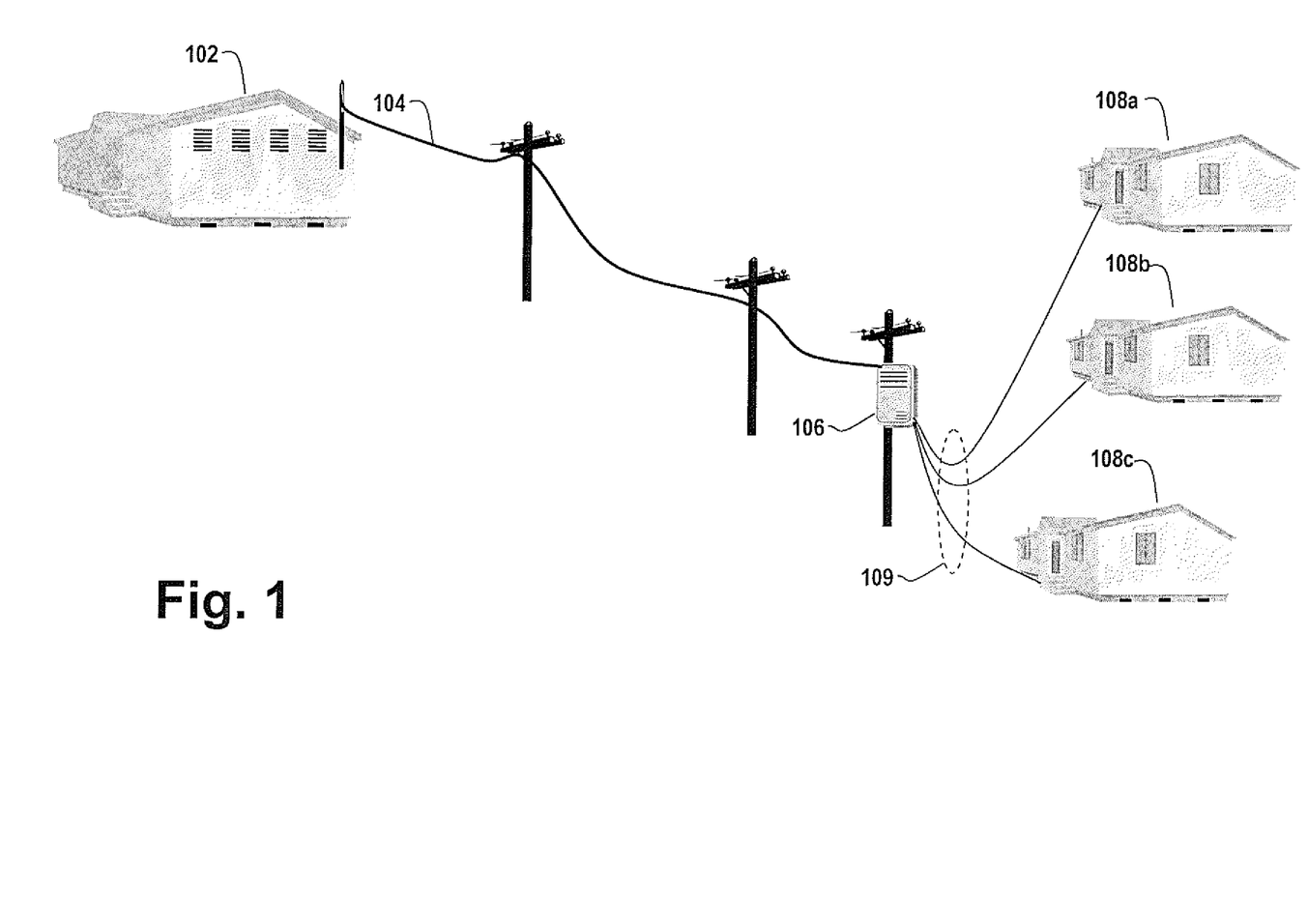
FIG. 1 illustrates a remotely deployed apparatus powered from a central office power supply means.

Referring to FIG. 1 there may be seen a diagram showing a remotely deployed apparatus 106, connected via telecommunication lines 104, to a telephony end-office 102. In this case apparatus 106 is providing services via "last mile" lines 109 to subscribers located in premises 108a, 108b, and 108c.

One example of a specific such apparatus is the Alcatel-Lucent 7330 Intelligent Services Access Manager Fiber-to-the-Node Sealed Expansion Module (SEM) which may be powered via twisted pair lines up to 5 kilo-feet away from an end-office.

Figure 2:
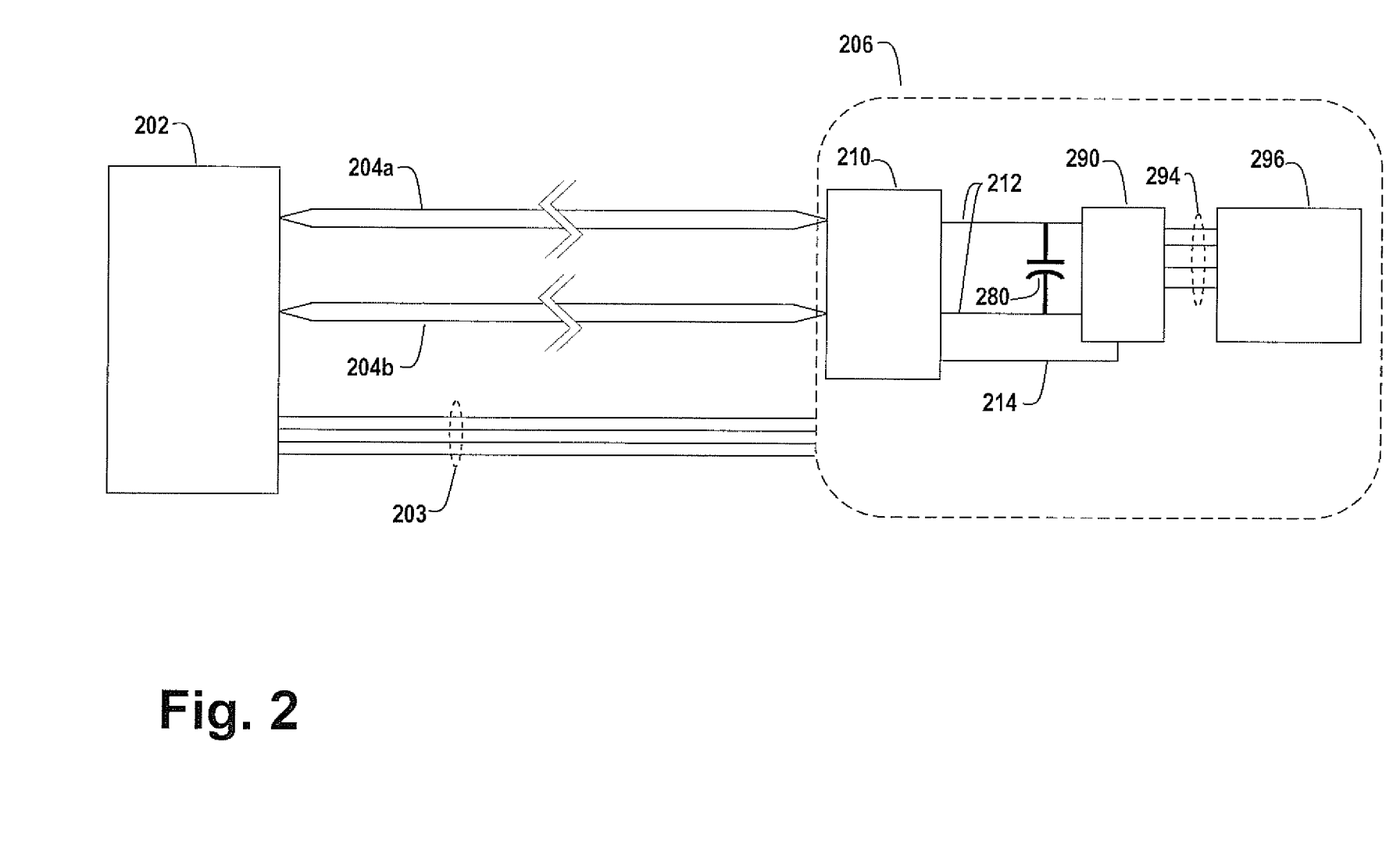
FIG. 2 illustrates a block diagram of a remotely powered apparatus according to an embodiment of the invention.

Referring to FIG. 2 there may be seen a block diagram showing more details of a remotely powered apparatus and wherein network power supply 202 located in the end-office communicates with remote apparatus 206 over twisted pairs 204a and 204b which carry supply voltages to the input current conditioning apparatus 210 located within remotely apparatus 206. Also located within remote apparatus 206 are bulk capacitance 280, and DC-DC power supply 290. Power supply 290 receives current from the input current conditioning apparatus 210 over power supply rails 212, and generates requisite voltages that are supplied by power supply connections 294 to further equipment 296 located in remote apparatus 206. Further equipment 206 may be, for example, line cards. Also visible is enable line 214 from input current conditioning apparatus 210 to power supply 290. In some embodiments, this enable line 214 is used to delay turn-on of power supply 290 for reasons which are explained in more detail below. Also visible in FIG. 2 are telecommunication lines 203 which connect remote apparatus 206 to the end-office and over which data may be transmitted and received.

Input bulk capacitance 280 is used at remote equipment 206 because of the significant impedance that is developed over the lengths of lines 204a and 204b under a situation of remote deployment. It assists power supply 290 in meeting changes in demand from further equipment 296, and lowers the effective supply line noise impedance for power supply 290.

Figure 3:
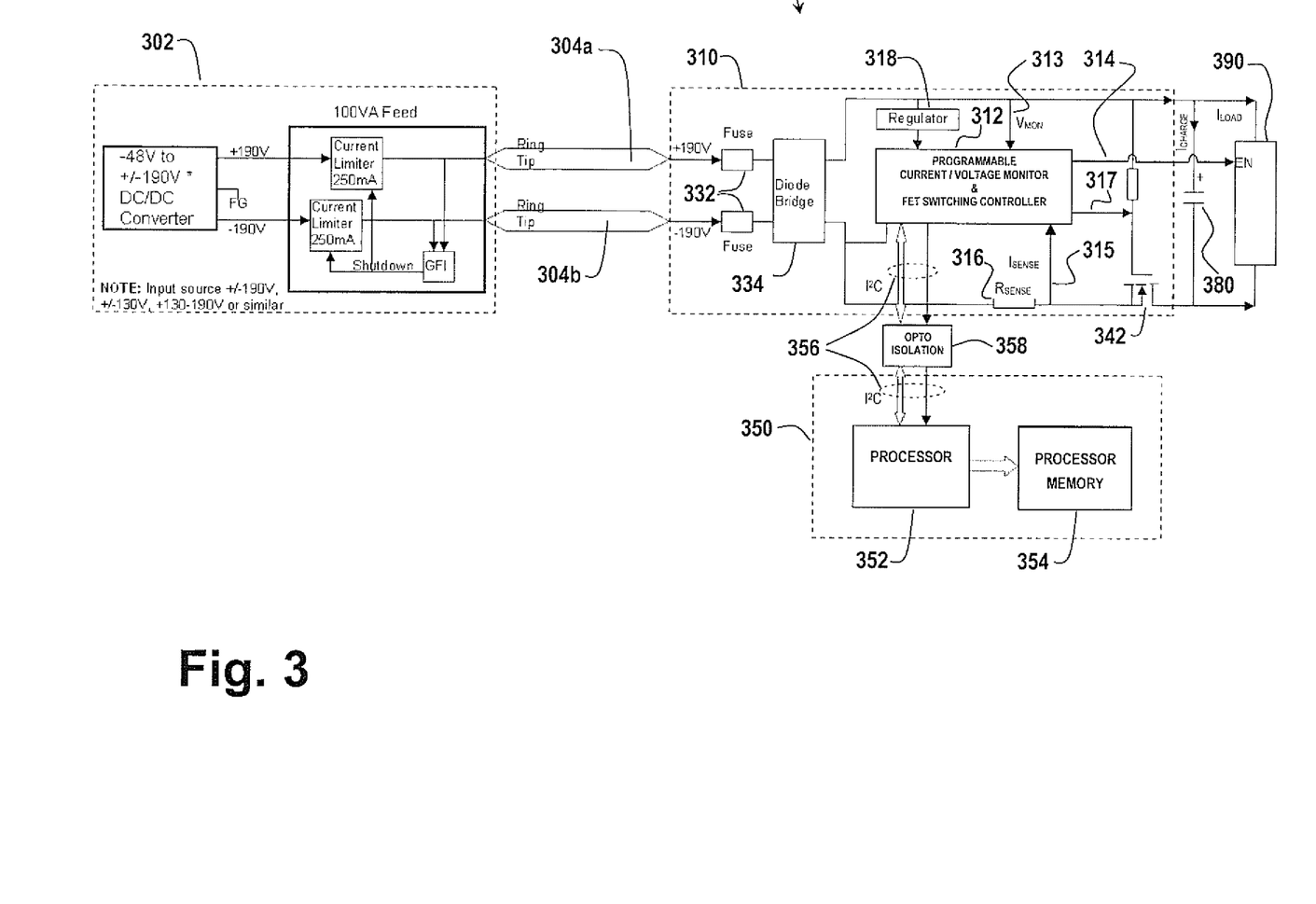
FIG. 3 illustrates a more detailed diagram of a remotely powered apparatus in accordance with an embodiment of the present invention.

Referring now to FIG. 3 there may be seen a more detailed block diagram of an embodiment of the invention in which network power supply 302 located in the end-office communicates with remote apparatus 306 over separate twisted pair feed lines 304a and 304b. The connection to twisted pairs 304a and 304b within remote apparatus 306 are fused at 332 and proceed through diode bridge 334 in order to control the polarity of the voltages supplied to the input current conditioning section which follows.

Input currents drawn by remote apparatus 306 are limited by operation of FET 342. When biased to an on-state, FET 342 conducts currents arriving on feed lines 304a and 304b to bulk capacitance 380 and DC-DC power supply 390. When the bias on FET 342 renders it non-conductive, currents into bulk capacitance 380 and DC-DC power supply 390 and apparatus supplied by power supply 390 are obstructed, minimizing the currents drawn from network power supply 302.

The bias on FET 342 is provided at 317 from the programmable current/voltage monitor and switching controller element 312. Controller element 312 monitors the voltage before it is presented to the bulk capacitance 380 via voltage monitoring line $V_{MON}$ 313. Controller element 313 also monitors the current flow into bulk capacitance 380 and DC-DC power supply 390 via a sense lead $I_{SENSE}$ 315 which monitors the voltage developed across a small value sense resistor $R_{SENSE}$ 316. A regulated voltage is supplied to controller element 312 from power regulator 318 to ensure stable controller operation over a range of input voltages and ambient temperature conditions.

In operation, controller element 312 monitors the current flow and operates to limit the peak current to a value below that of the rated limit of network power supply 302 by opening FET 342, i.e. rendering it non-conductive, when the sensed current approaches critical values. The critical values are established for controller element 312 via communication over the Integrated Interface Controller ($I^2C$) bus 356 from programmable controller 350. The $I^2C$ bus 356 uses optical isolation via opto-isolator 358 to separate the low voltage circuitry of programmable controller 350 from the higher voltages present at the controller element 312.

Programmable controller 350 comprises a processor 352 and an associated processor memory 354. Instructions for peak current flow and timing characteristics are stored in processor memory 354 and may be reprogrammed. Communication between programmable controller 350 and telecommunications craftpersons may be carried out over telecommunication lines 203, or via local interface ports (not shown) for craftpersons working at the remote location.

Figure 4:
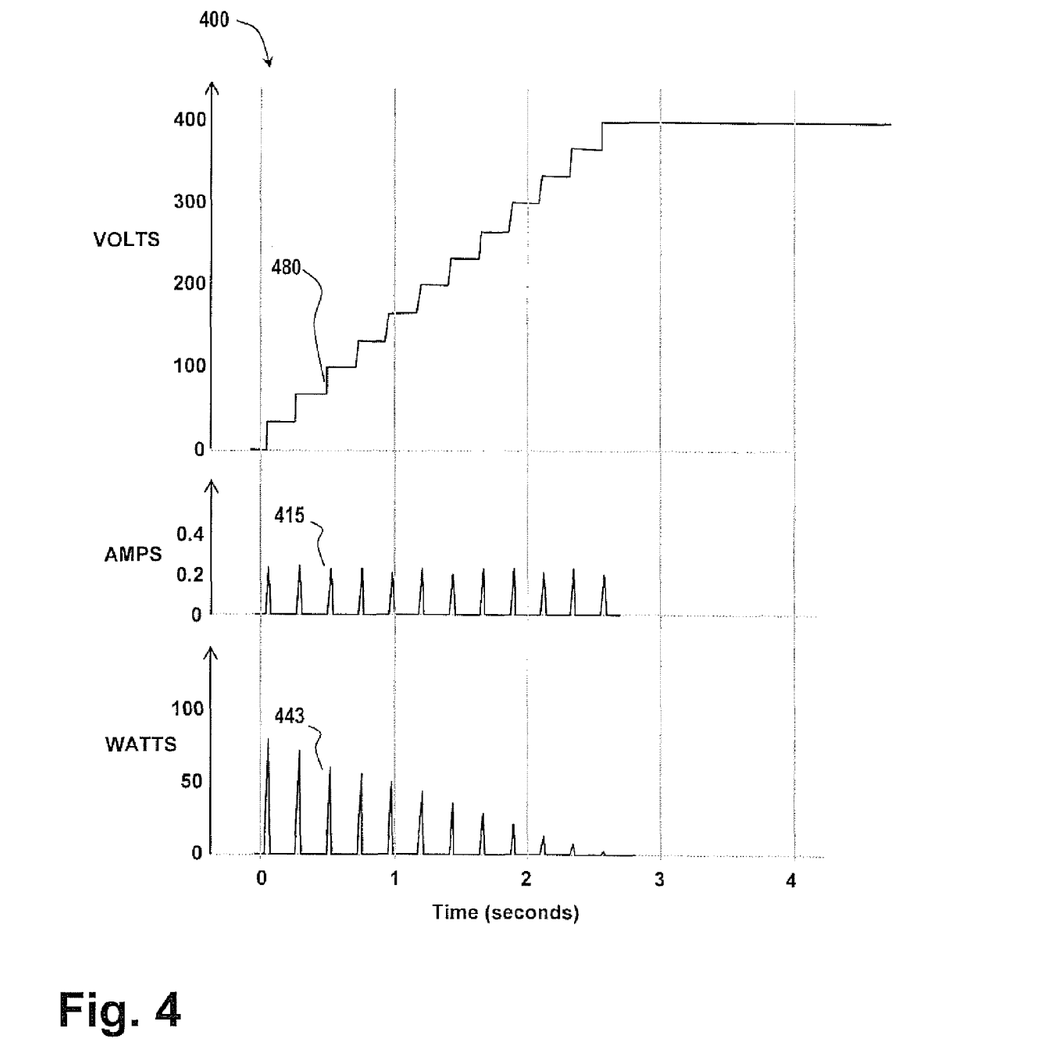
FIG. 4 illustrates a depiction of startup supply voltages and currents which could occur in accordance with an embodiment of the present invention.

The operation of the input current conditioning apparatus will now be described with reference to FIG. 3 and also FIG. 4 which depicts current flows and voltage levels as may be monitored at $V_{MON}$ 313 and $I_{SENSE}$ 315 of FIG. 3. FIG. 4 at 400 shows a time trace of voltage levels 480, current flow 415, and power dissipation 443 at FET 342 during startup when voltage from the network power supply is first applied to the remote apparatus. At this point in time, the voltage on the bulk capacitance commences at 0 V, and the application of the supply voltage from the network power supply produces a surge of current, the first of the series of spikes at the series of spikes referenced at 415. This influx of current is limited by the controller element 312 which senses the inrush current spike and consequently biases the FET 342 to a non-conductive state for a period of time. The influx of current acts to charge bulk capacitance 380 to some extent, as may be seen by the first step on the series of staircase steps at 413. After a period of time, which is preset and of a magnitude so as to allow FET 342 to stay in its rated Safe Operating Area, the FET 342 is biased back to a conductive state and a subsequent current pulse occurs, which is interrupted as the controller element senses that it is approaching a preset critical limit, and which serves to further charge bulk capacitance 380 another voltage increment. This sequence continues until a point in time is reached whereat bulk capacitance 380 is fully charged, at which point the incoming current will converge on normal operating current.

For normal network power supplies, safety regulations impose requirements that peak output currents be limited to less than a specific value, for example 250 mA or 265 mA. The software instructions stored in processor memory 354 will be encoded with the specific requisite value for the operating jurisdiction in which the remote apparatus and end-office are located, and the operation of the input current conditioner will ensure that the currents drawn stay below this critical value.

A further advantageous aspect of operation is achieved via use of enable line 314 which connects DC-DC power supply 390 to controller element 312, and allows controller element 312 to disable the operation of power supply 390. During startup, controller element 312 purposefully keeps power supply 390 disabled, thereby eliminating the normal operating current that power supply 390 would draw from network power supply 302. Once controller element 312 has verified that the voltage on bulk capacitance 380 has reached its proper value, i.e. has charged to the power supply rail value and will no longer induce inrush currents, it proceeds to enable power supply 390. This sequence of operations ensures that there is not a combined demand for current i.e. for charging the bulk capacitance 380 and for operating power supply 390 and its associated downstream loads. Instead the bulk capacitance 380 is charged to operational level and then DC-DC power supply 390 is enabled. There is a further advantage in terms of reducing stresses on power supply 390, as during startup it is enabled once, and can source its startup-current needs from a fully charge bulk input capacitance. The time delay after which DC-DC power supply 390 is enabled is programmable via the software stored in processor memory 354.

The aforegoing discussion has discussed operation at startup. The invention offers further advantages in the case of a fault.

Figure 5:
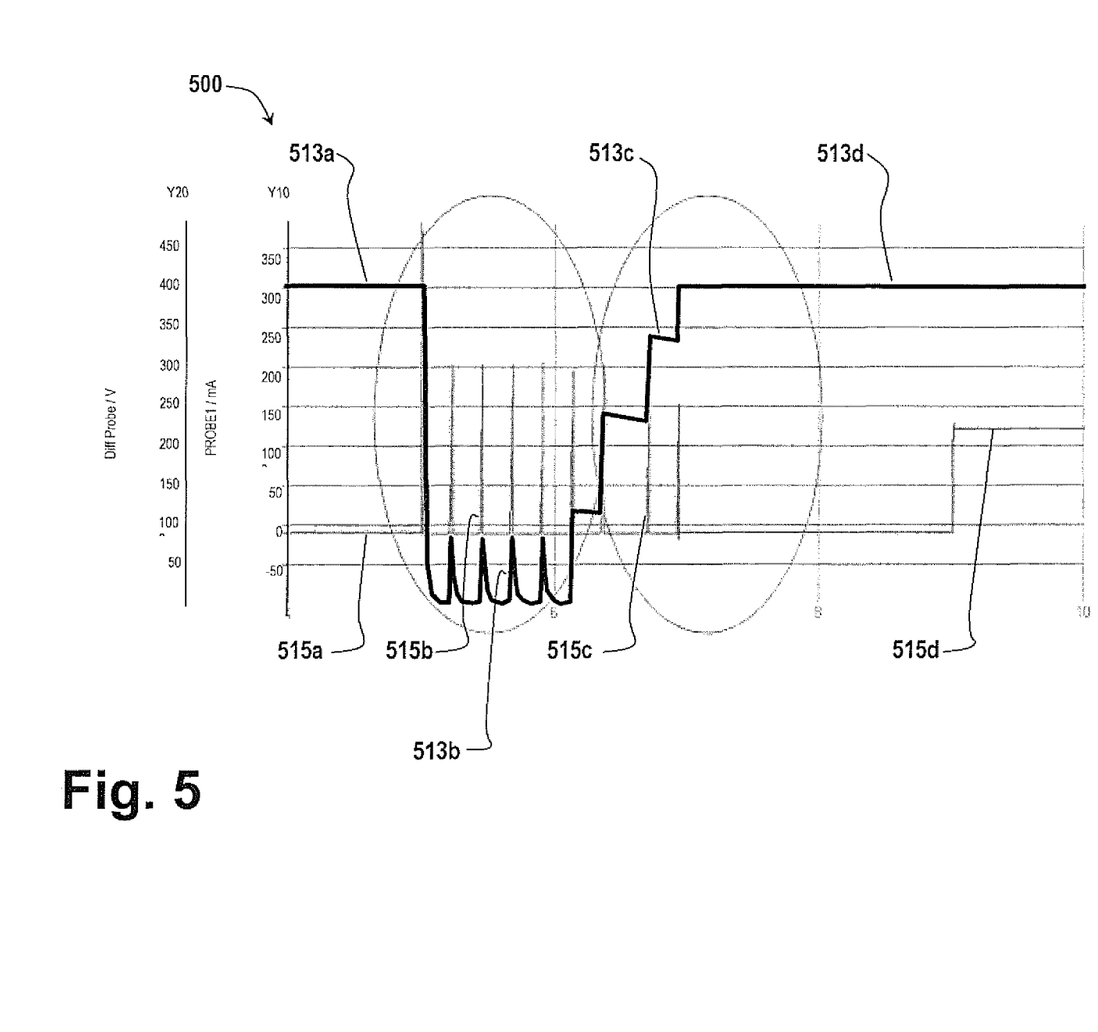
FIG. 5 illustrates a depiction of failure mode supply voltages and currents which could occur in accordance with an embodiment of the present invention; and, FIG. 6 illustrates a depiction of operating variables which are subject to programming in accordance with an embodiment of the present invention.

Referring to FIG. 5, there may be seen a time plot 500 of current flows and voltage levels as may be seen at bulk capacitance 380 and $I_{SENSE}$ 315 of FIG. 3 in the event of a fault condition occurring either within DC-DC power supply 390, or in one of the downstream loads supplied by it. At the outset, there is a state of normal operation wherein the voltage level at 513a is at its normal operational level, and the current at 515a is likewise. A fault then occurs which crashes the monitored voltage levels and demands substantial currents from the network power supply in order to maintain the voltage levels. As these currents approach and reach the critical threshold, current controller 312 renders the FET 342 non-conductive and the currents drop to zero, as does the measured voltages. After a period of time, current controller renders FET 342 conductive again, but if the fault has not yet been removed, the current will again approach and reach the critical threshold at which the current controller will operate to block it. This process will repeat and the voltage effects may be discerned on the time plot 500 at 513b, with the concurrent current effects depicted at 515b. This hiccup-mode of operation can be extended indefinitely, given that the timing between pulses has been preset so as to ensure that FET 342 remains within its long term Safe Operating Area.

If at a subsequent point in time the fault is removed, then the overall operation retraces a startup sequence. As may be seen at time plot points 513c and 515c, with the fault removed the voltage on bulk capacitance 380 will commence its staircase charging, until it reaches full charge as indicated at points 513d. In the event that DC-DC power supply 390 had been disabled, it would be re-enabled via control line 314 and would commence to draw its normal operating current and supplying its downstream loads as indicated at 515d.

Figure 6:
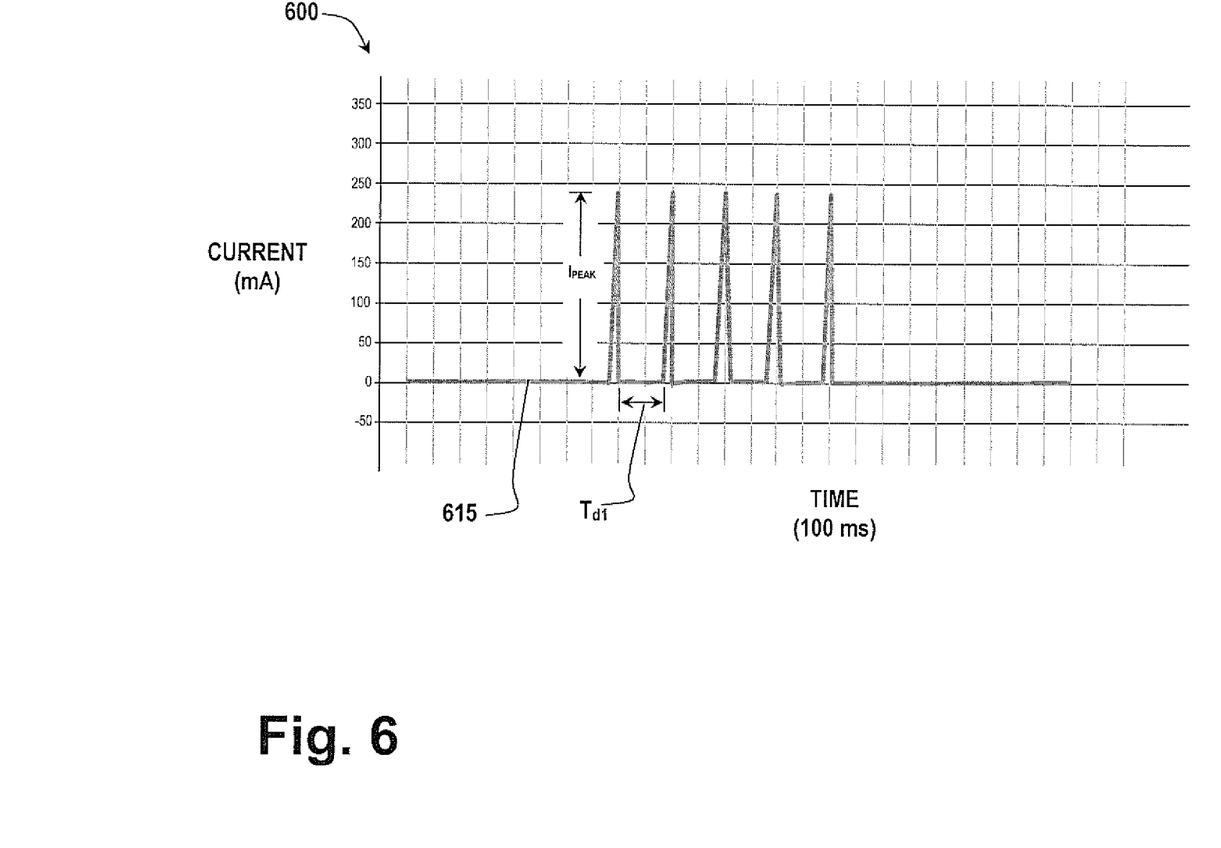

Referring to FIG. 6, there is an illustrative time plot 600 which depicts current flows 615 while in hiccup mode. Settings stored in software in processor memory 354 define the allowable $I_{PEAK}$ that can flow, but beyond which controller element 312 will operate to open FET 342. Likewise, other settings will be stored to specify time delay $T_{d1}$ which corresponds to how long controller element 312 will wait before rendering FET 342 conductive again. As discussed previously, this delay is timed so as to not put excessive stress on FET 342. Within a safe operating range, the time delay $T_{d1}$ can be programmed for different values to provide adjustments to the startup times. For example, dependent upon the value of bulk capacitance 380, $T_{d1}$ can be programmed to provide more or fewer steps, corresponding to quicker and slower ramp-up times. The preferred value for $T_{d1}$ will be a function of circuit conditions such as loop length, gauge of cabling used, total capacitance, anticipated ambient temperatures, and other circuit conditions.

An additional feature made available due to the presence of processor 352 and the Integrated Interface Controller bus 356 is the ability to monitor and report on current and voltage measurements over time. The system software can use the current and voltage readings to record peak current threshold crossings with time stamps, report errors or faults on the power feed and power draw, record power statistics for fault analysis, and provide appropriate alarms or corrective action based on the accumulated readings. The presence of processor 352 also allows the input current conditioner to adjust for conditions of component tolerancing and component value change, as might happen with aging or ambient temperature effects. For example, the controller can monitor the rectified input voltage at $V_{MON}$, and if the peak current setting presently set is too high, resulting in an associated voltage drop being logged per pulse, the controller can compensate and lower the peak current setting.

In summary, an apparatus and associated method has been disclosed which provides input current conditioning which avoids remote apparatus placing network power supplies in fault modes due to excessive current draw. The apparatus and method allow for deployment of quantities of bulk filtering capacitance at the remote apparatus which enhance the operating of the remote apparatus. The disclosed apparatus allows operation which is self-monitoring and has compensation for temperature and component changes.

It is to be understood that various changes in the details, materials, and arrangements of the parts which have been described and illustrated in order to explain the nature of this invention may be made by those skilled in the art without departing from the scope of the invention as expressed in the following claims.

It should also be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation." Numerous modifications, variations and adaptations may be made to the embodiment of the invention described above without departing from the scope of the invention, which is defined in the claims.

What is claimed is:

1. An apparatus for providing input current conditioning of a supply current provided to a remote apparatus from a network power supply, the apparatus comprising:
   a current controller configured to receive a maximum current limit value;
   a current sensing circuit connected to said current controller; and
   a controllable series element through which the supply current flows, configured to be rendered non-conductive by said current controller when said current sensing circuit indicates that the supply current exceeds said received maximum current limit value and configured to be conductive after a voltage on a bulk capacitor has reached a power supply rail value.

2. The apparatus as claimed in claim 1, further comprising:
   a programmable controller connected to said current controller, wherein said programmable controller is configured to be a source of said maximum current limit value.

3. The apparatus as claimed in claim 2, wherein said programmable controller further comprises:
   a processor; and
   a memory associated with said processor, wherein said memory contains programming instructions and values related to said maximum current limit value.

4. The apparatus as claimed in claim 3, further comprising:
   voltage sensing circuitry connected to said current controller.

5. The apparatus as claimed in claim 4, wherein said processor is connected to said current controller over a communications bus and measured values of current and voltage are communicated from said current controller to said processor over said communications bus.

6. The apparatus as claimed in claim 5, wherein said communications bus comprises an Integrated Interface Controller bus.

7. The apparatus as claimed in claim 5, wherein said measured values may be stored for use in later calculations.

8. The apparatus as claimed in claim 7, wherein said later calculations include calculating operational statistics.

9. The apparatus as claimed in claim 8, wherein results of said later calculations are used to change operating characteristics of said current controller.

10. The apparatus as claimed in claim 8, wherein results of said later calculations are reported to an operator.

11. The apparatus as claimed in claim 4, further comprising:
    enable circuitry connected from said current controller to a downstream power supply, wherein said current controller is configured to use said enable circuitry to disable said downstream power supply.

12. The apparatus as claimed in claim 11, wherein said current controller is configured to disable said downstream power supply until a preset operational state is reached.

13. The apparatus as claimed in claim 12, wherein said preset operational state corresponds to a particular monitored voltage level.

14. The apparatus as claimed in claim 12, wherein said controllable series element is a semiconductor.

15. The apparatus as claimed in claim 14, wherein said semiconductor is a field effect transistor.

16. The apparatus as claimed in claim 14, wherein said semiconductor is a bipolar transistor.

17. A method for controlling a current drawn by a remote apparatus from a network power supply, the method comprising: monitoring a current drawn by a current controller located in said remote apparatus; comparing the monitored current to a preset current threshold; and in the event that the monitored current exceeds said preset current threshold, then opening a pass element for a period of time until a voltage on a bulk capacitor has reached a power supply rail value further comprising:
    measuring a voltage at said remote apparatus; comparing the measured voltage to a preset voltage threshold; and in the event that the measured voltage meets or exceeds said preset voltage threshold, then enabling additional circuitry to draw current from said network power supply.

18. The method as claimed in claim 17, further comprising: measuring a voltage at said remote apparatus;
    measuring a current drawn at said remote apparatus; and storing said measured voltage and the measured current for later calculations.

19. The method as claimed in claim 18, further comprising: performing said later calculations;
    transmitting results of said later calculations to an operator.

* * * * *